US008467952B2

(12) United States Patent
Nakamura

(10) Patent No.: US 8,467,952 B2
(45) Date of Patent: Jun. 18, 2013

(54) MAP GENERATING DEVICE, AND MEMORY MEDIUM STORING MAP GENERATING PROGRAM

(75) Inventor: Tomoki Nakamura, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 297 days.

(21) Appl. No.: 13/053,373

(22) Filed: Mar. 22, 2011

(65) Prior Publication Data

US 2012/0078505 A1 Mar. 29, 2012

(30) Foreign Application Priority Data

Sep. 29, 2010 (JP) .................................. 2010-218095

(51) Int. Cl.
*G01C 21/00* (2006.01)
(52) U.S. Cl.
USPC ............................ 701/201; 701/409; 701/533
(58) Field of Classification Search
USPC ................... 701/201, 533, 409, 426, 532, 13, 701/538; 455/456.3; 345/419, 672, 420; 709/203; 700/255, 218, 245; 235/462.1
See application file for complete search history.

(56) References Cited

U.S. PATENT DOCUMENTS

| 2006/0241862 | A1* | 10/2006 | Ichihara et al. | 701/209 |
| 2011/0022307 | A1* | 1/2011 | Lee | 701/202 |

FOREIGN PATENT DOCUMENTS

| JP | 4372212 | 12/1992 |
| JP | A-5-303331 | 11/1993 |
| JP | A-7-035559 | 2/1995 |
| JP | A-7-280582 | 10/1995 |
| JP | 2000-046570 A | 2/2000 |
| JP | A-2002-351311 | 12/2002 |
| JP | 3114884 | 9/2005 |
| JP | A-2006-119558 | 5/2006 |
| WO | WO 2007/105543 A1 | 9/2007 |

OTHER PUBLICATIONS

Notification of Reason for Refusal dated Oct. 2, 2012 received from the Japanese Patent Office from related Japanese Application No. 2010-218095, together with an English-language translation.

* cited by examiner

*Primary Examiner* — Behrang Badii
(74) *Attorney, Agent, or Firm* — Scully, Scott, Murphy & Presser, P.C.

(57) ABSTRACT

A map generating device constructed to generate a map wherein character rows of a first kind which are disposed near road symbols representing roads selected as a route from a start point to a destination point and which identify buildings and other facilities, for example, are oriented according to respective different directions of movement of the user of the map on the respective roads toward the destination point, so that the character rows of the first kind can be easily read by the user tracing the route while relying on the character rows of the first kind. Also disclosed is a memory medium storing a map generating program which is executed by a computer to generate the map.

20 Claims, 5 Drawing Sheets

FIG.2A
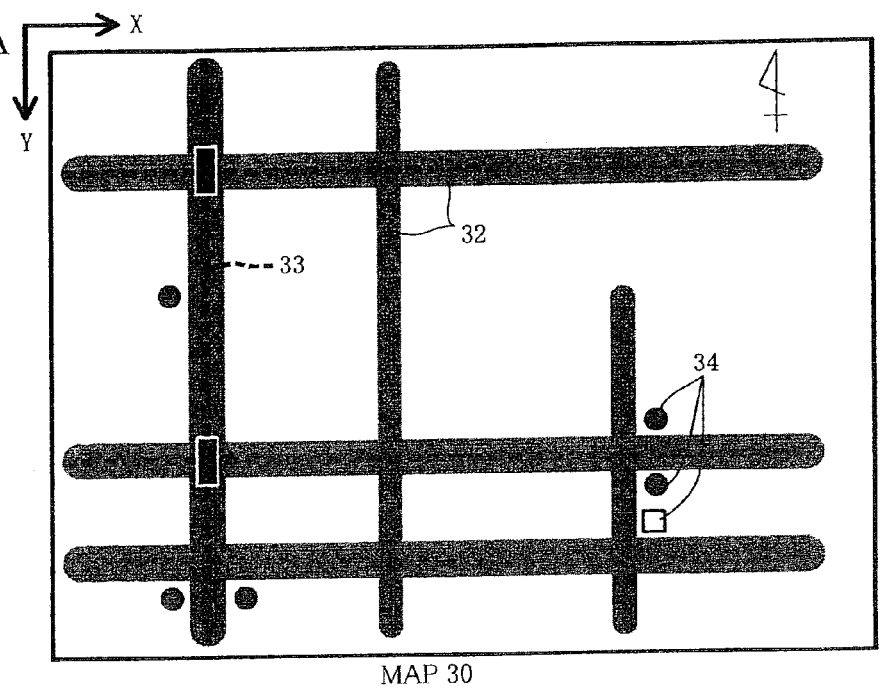
MAP 30
FIG.2B
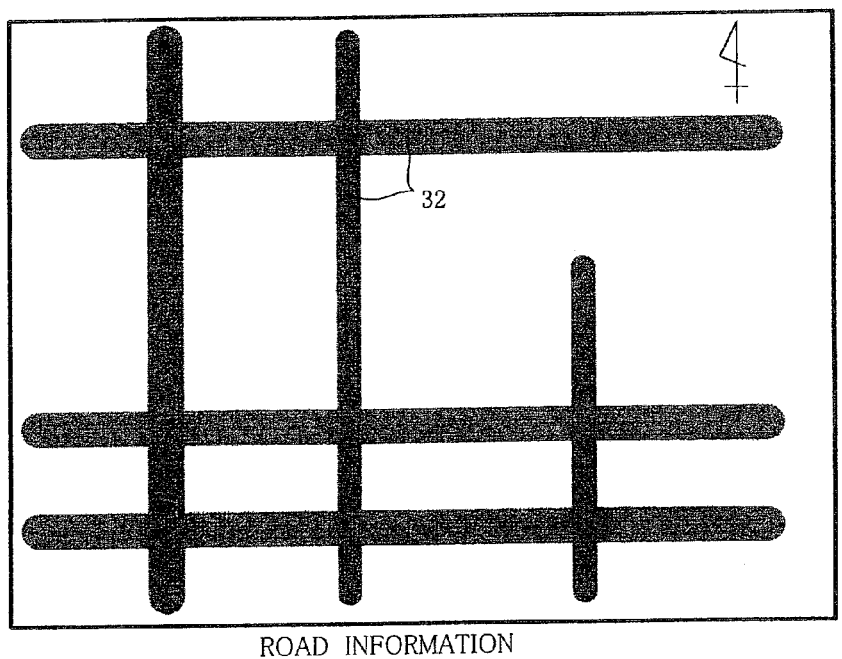
ROAD INFORMATION
FIG.2C
| ID | COORDINATES | NAMES |
|---|---|---|
| 1 | $(x_1, y_1)$ | NAGOYA TV TOWER |
| 2 | $(x_2, y_2)$ | MK DEPARTMENT STORE |
| 3 | $(x_3, y_3)$ | TN BUILDING |
| ⋮ | ⋮ | |
POINT INFORMATION

MAP GENERATING DEVICE, AND MEMORY MEDIUM STORING MAP GENERATING PROGRAM

CROSS REFERENCE TO RELATED APPLICATION

The present application claims the priority from Japanese Patent Application No. 2010-218095 filed Sep. 29, 2010, the disclosure of which is herein incorporated by reference in its entirety.

BACKGROUND OF THE INVENTION

1. Field of the Invention

The present invention relates to a memory medium which stores a program for generating the map, and a device constructed to generate a map.

2. Description of Related Art

There is known a map generating device constructed to generate map data representing a route to a destination desired by the user. An automobile navigation device is an example of such a map generating device. The automobile navigation device is configured to display various facilities located along a navigation route, and to indicate the names of the facilities in an emphasized or accentuated manner if the displayed facilities and navigation route overlap each other or are located adjacent to each other.

SUMMARY OF THE INVENTION

The automobile navigation device as described above is configured to update from time to time the displayed map such that the upward direction in the displayed map coincides with the direction of running of an automobile provided with the navigation device. Where a paper map is used to find an adequate route to the desired destination, however, the user of the paper map must turn or rotate the paper map as the direction of movement of the user changes, so that the upward direction in the map coincides with the direction of movement of the user. Namely, the paper map is generally drafted such that the upward direction in the map coincides with the north direction. When the user of the paper map moves in the south direction, for example, the user must turn the paper map upside down, and read characters (letters) on the map upside down. Thus, the user tends to have difficulty in reading the characters on the paper map when the paper map is turned to find the route to the destination point.

A similar problem as described above with respect to the user of the paper map is encountered when a portable communication terminal such as a cellular phone is used to display a navigation map to find the route to the desired destination point, where the displayed navigation map is not turned or rotated according to a change of the direction of movement of the user of the portable communication terminal.

The present invention was made in view of the background art described above. It is therefore a first object of the present invention to provide a memory medium which stores a map generating program prepared to generate the map described above with respect to the map generating device. A second object of the invention is to provide a map generating device capable of generating a map such that rows of characters displayed on the map can be easily read by the user when the map is read by the user to find an adequate route from the start point to the desired destination point.

The first object indicated above can be achieved according to a first aspect of this invention, which provides a memory medium storing a map generating program executed by a computer, the program comprising the steps of: obtaining map information for generating a map which includes a start point and a destination point; obtaining route information indicative of at least one road selected as a route from the start point to the destination point, from among roads indicated in the map; obtaining, on the basis of the obtained route information, a direction of movement on each of the at least one road selected as the route, from the start point toward the destination point; obtaining character information corresponding to rows of characters disposed in the map; the step of selecting at least one character row as a character row of a first kind from among the rows of characters corresponding to the obtained character information, on the basis of positional relationships between the rows of characters and each of the at least one road selected as the route, each of the at least one character row of the first kind being indicated in the map in a variable indication manner, while each of at least one character row of a second kind which is other than the at least one character row of the first kind being indicated in the map in a non-variable indication manner; determining, when a plurality of roads having at least two different directions of movement are selected as the route on the basis of the obtained route information, the indication manner of each of the character rows of the first kind selected on the basis of the positional relationships of the character rows with the respective roads, according to the at least two different directions of movement on the respective roads, such that the indication manner of the character rows of the first kind having one of the at least two different directions is different from the indication manner of the character rows of the first kind having another of the at least two different directions; and generating the map on the basis of the obtained map information and the obtained character information, such that the character rows of the first kind are indicated in the map in the determined manners.

The second object indicated above can be achieved according to a second aspect of the invention, which provides a map generating device comprising: a map-information obtaining portion configured to obtain map information for generating a map which includes a start point and a destination point; a route-information obtaining portion configured to obtain route information indicative of at least one road selected as a route from the start point to the destination point, from among roads indicated in the map; a movement-direction obtaining portion configured to obtain, on the basis of the obtained route information, a direction of movement on each of the at least one road selected as the route, from the start point toward the destination point; character-information obtaining portion configured to obtain character information corresponding to rows of characters disposed in the map; character-row selecting portion configured to select at least one character row as a character row of a first kind from among the rows of characters corresponding to the obtained character information, on the basis of positional relationships between the rows of characters and each of the at least one road selected as the route, each of the at least one character row of the first kind being indicated in the map in a variable indication manner, while each of at least one character row of a second kind which is other than the at least one character row of the first kind being indicated in the map in a non-variable indication manner; an indication-manner determining portion configured to be operable when a plurality of roads having at least two different directions of movement are selected as the route on the basis of the obtained route information, to determine the indication manner of each of the character rows of the first kind selected on the basis of the positional relationships of the character rows with the respective roads, according to the at least two different directions of movement on the respective roads, such that the indication manner of each character row of the first kind having one of the at least two different directions is different from the indication manner of each character row of the first kind having another of the at least two different directions; and a map generating portion configured to generate the map on the basis of the map information obtained by the map-information obtaining portion and the character information obtained by the character-information obtaining portion, such that the character rows of the first kind are indicated in the map in the indication manners determined by the indication-manner determining portion.

BRIEF DESCRIPTION OF THE DRAWINGS

The above and other objects, features, advantages and technical and industrial significance of the present invention will be better understood by reading the following detailed description of a preferred embodiment of the present invention, when considered in connection with the accompanying drawings, in which:

FIG. 2A is a view showing an example of a map to be drawn according to map information, and FIG. 2B is a view illustrating an example of road information, while FIG. 2C is a view indicating an example of point information;

DETAILED DESCRIPTION OF THE PREFERRED EMBODIMENTS

Figure 1:
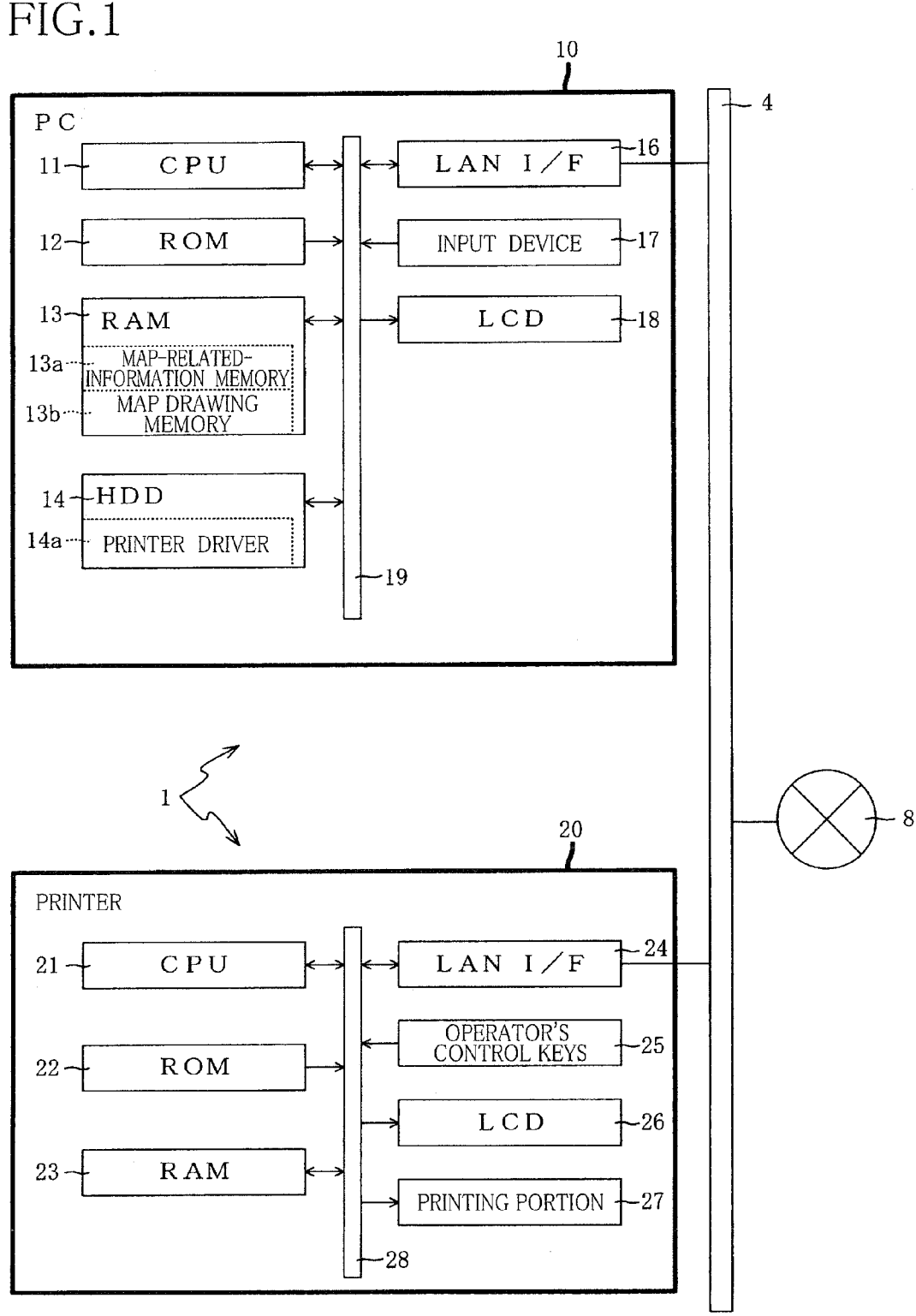
FIG. 1 is a functional block diagram illustrating a map generating device which is constructed according to one embodiment of the present invention and which includes a personal computer incorporating a printer driver providing a map generating program according to the embodiment, and a printer connected to the personal computer.

The preferred embodiment of this invention will be described by reference to the accompanying drawings. Referring first to the functional block diagram of FIG. 1, there is schematically shown a map generating device 1 which is constructed according to one preferred embodiment of this invention and which includes a personal computer 10 (hereinafter referred to as "PC 10") and a printer 20. The PC 10 incorporates a printer driver 14a which provides a map generating program according to the embodiment. As shown in FIG. 1, the PC 10 and the printer 20 are connected to each other through a LAN (local area network) 4, which is connected to an internet 8 through a router (not shown).

The printer driver 14a provides the map generating program for controlling the printer 20 to print a map. The map to be printed by the printer 20 under the control of the printer driver 14a includes rows of characters (letters) oriented for easy reading by the user who sees the map to find an adequate route from a start point to a desired destination point, while reading the rows of characters.

The PC 10 incorporates, as major elements thereof, a CPU 11, a ROM 12, a RAM 13, a hard disk drive 14 (hereinafter referred to as "HDD 14"), a LAN interface 16 (hereinafter referred to as "LAN I/F 16"), an input device 17, and a LCD 18. These elements of the PC 10 are interconnected to each other through a bus line 19.

The CPU 11 controls the other elements of the PC 10 interconnected thereto through the bus line 19, according to fixed values and control programs stored in the ROM 12 and RAM 13. The ROM 12 is a memory storing the control programs and other data for controlling the PC 10. The RAM 13 is a memory which temporarily store data necessary for processing operations performed by the CPU 11, such that the data can be written into and read from the RAM 13. The RAM 13 includes a map-related-information memory 13a for storing map-related information, and a map drawing memory 13b for storing map-drawing information. The map-related information stored in the map-related-information memory 13a will be described by reference to FIGS. 2A, 2B and 2C, while the map-drawing information stored in the map drawing memory 13b will be described by reference to FIG. 3.

The HDD 14 is provided with the printer driver 14a, which provides the program for controlling the printer 20. The CPU 11 executes a map generating routine which is illustrated in the flow chart of FIG. 4 and which will be described. The LAN I/F 16 is provided for connection of the PC 10 to the LAN 4, and the input device 17 is a device through which control commands and information are manually input into the PC 10. The LCD 18 displays various kinds of information.

The printer 20 includes, as major elements thereof, a CPU 21, a ROM 22, a RAM 23, a LAN interface 24 (hereinafter referred to as "LAN I/F 24"), operator's control keys 25, a LCD 26 and a printing portion 27. These elements of the printer 20 are interconnected to each other through a bus line 28

The CPU 21 performs various processing operations according to control programs stored in the ROM 22. The ROM 22 is a memory storing control programs and other data for controlling the printer 20, and the RAM 23 is a memory temporarily storing data necessary for processing operations performed by the CPU 21.

The operator's control keys 25 are manually operated to input control commands and information into the printer 30. The LCD 26 displays various kinds of information. The printing portion 27 is operated according to printing data received by the printer 21 from the PC 10 through the LAN I/F 24, to print an image.

Referring next to FIG. 2, the map-related information will be described. The PC 10 obtains the map-related information for drawing a map, from map searching websites through the internet 8, or map applications (not shown) installed in the HDD 14, for example, and stores the map-related information in the map-related-information memory 13a.

The map-related information includes map information, road information and point information. FIG. 2A shows an example of a map 30 to be drawn according to the map information. The map information consists of image data representing values of picture elements of the map 30. The picture elements within the map 30 are defined by coordinate values (x, y) in an XY coordinate system which has a zero point at a left upper corner point of the map 30, an X-axis direction parallel to the lateral direction A (east-west direction) of the map 30, and a Y-axis direction parallel to the vertical direction (south-north direction) of the map 30.

As shown in FIG. 2A, the map 30 is drawn in the present embodiment such that the upward direction in the image of the map 30 coincides with the north direction. The map 30 includes road symbols 32, railroad symbols 33, and facility symbols 34. The road symbols 32 are images representing layouts of actual roads, and the railroad symbols 33 are images representing lines of actual railways, while the facility symbols 34 are image representing locations of actual buildings and other facilities.

Referring next to FIG. 2B, there is schematically illustrated an example of the road information. The road information is the information for distinguishing the picture elements of the road symbols 32 and the picture elements of the images other than the road symbols 32, from each other. On the basis of the road information, at least one of the road symbols 32 which represents at least one road selected as a route from a start point to a desired destination point is determined.

FIG. 2C indicates an example of the point information. The point information is the information for disposing rows of characters or letters 36 (described below by reference to FIG. 3) in the map 30. As indicated in FIG. 2C, the point information includes IDs, coordinates and names. The "IDs" are numbers assigned to respective sets of the point information, and the "coordinates" represent reference positions used to dispose the rows of characters 36 in the map 30. The reference positions for the rows of characters 36 identifying the roads represented by the road symbols 32 are set near the road symbols 32. The reference positions for the rows of characters 36 identifying the railroads represented by the railroad symbols 33 and railroad stations are set near the railroad symbols 33. The reference positions for the rows of characters 36 identifying the buildings and other facilities represented by the facility symbols 34 are set near the facility symbols 34. The "names" are sets of character information corresponding to the rows of characters 36 disposed in the map 30, and identify the roads, railroads, stations and facilities.

Figure 3:
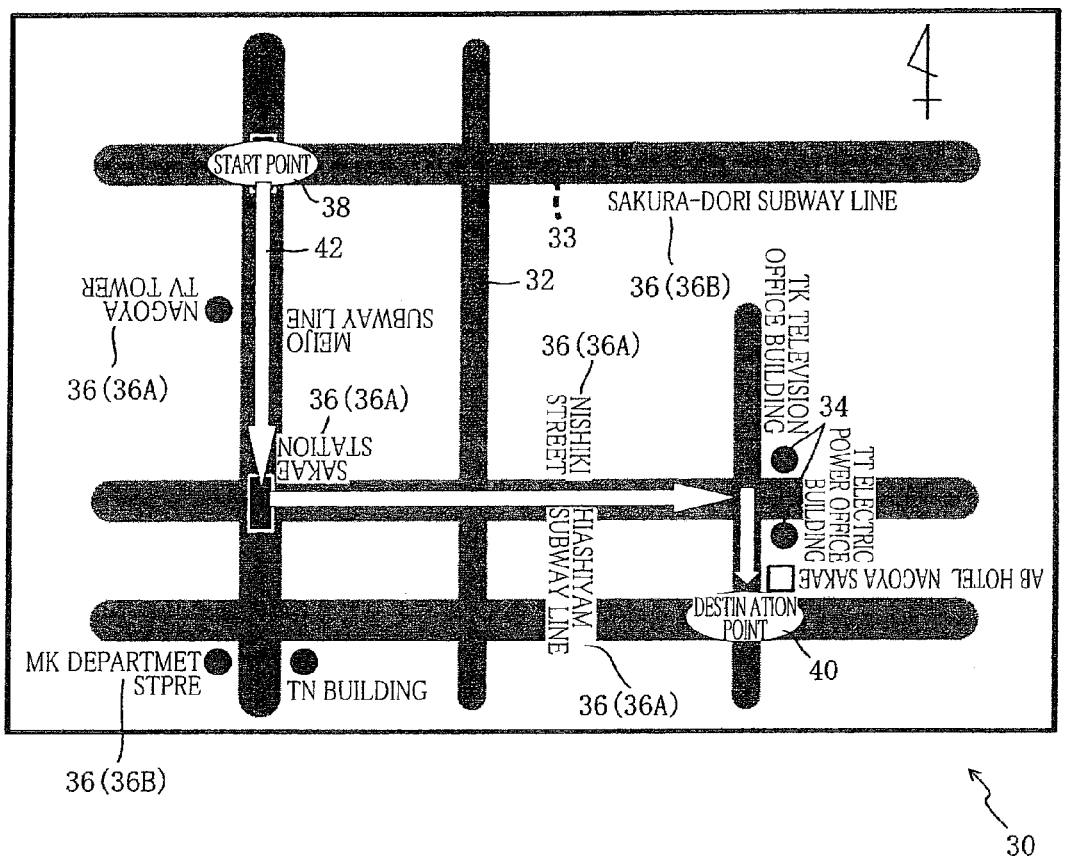
FIG. 3 is a view showing an example of a map to be generated according to a map generating routine executed by the personal computer.

FIG. 3 illustrates an example of the map 30 to be generated according to the map generating routine executed by the PC 30. The term "generation" of the map 30 is interpreted to mean drawing or drafting the map 30 in the map drawing memory 13b on the basis of the map information, and disposing in the map 30 the rows of characters 36, a start point 38, a destination point 40, and arrows 42 indicating the route from the start point 38 to the destination point 40.

As shown in FIG. 3, the arrow 42 is superposed on each of at least one of the road symbols 32 representing at least one road selected as the route from the start point 38 to the destination point 40. Each arrow 42 which indicates the route also indicates the direction of movement from the start point 38 to the destination point 40. The start point 38 and the destination point 40 are set by the user of the PC 10. Since a processing operation to select the route from the start point 38 to the destination point 40 is well known in the art, no detailed description of this processing operation will be provided.

Then, the PC 10 selects, as a character row 36A of a first kind, each row of characters 36 disposed in an area of the map 30 within a predetermined distance from the position of each of at least one road symbol 32 representing at least one road selected as the route from the start point 38 to the destination point 40. The PC 10 then orients the character row 36A of the first kind according to the direction of movement of the user of the map 30 from the start point 38 to the destination point 40 along the route, such that the upward direction of the characters coincides with the direction of movement. Each of the rows of characters 36 other than the character rows 36A of the first kind will be referred to as "a character row 36B of a second kind".

The map 30 thus generated is printed by the printer 20. The use of the printed map 30 has the following advantages. When the user of the printed map 30 traces the route from the start point 38 to the destination point 40 while watching the map 30, the user may turn or rotate the map 30 according to a change of the direction of movement of the user, so that the upward direction in the map 30 held almost vertically by the user or the horizontal direction parallel to the direction of movement of the user holding the map 30 almost horizontally coincides with the direction of movement. In this case, the user can easily read the character rows 36A of the first kind since the character rows 36A are oriented according to the direction of movement of the user such that the upward direction of the characters coincides with the direction of movement, that is, such that the characters in the character rows 36A of the first kind stand normally as seen in the direction of movement of the user tracing the route.

For example, the characters "NAGOYA TV TOWER" in the character row 36A of the first kind which is disposed in the area within the predetermined distance from the road symbol 32 representing the road extending from the start point 38 in the south direction stand upside down in the map 30 wherein the upward direction coincides with the north direction. Accordingly, when the user of the map 30 turns the map 30 upside down, during a movement of the user in the south direction, such that the upward direction coincides with the south direction in the map 30, the characters "NAGOYA TV TOWER" in the character row 36A of the first kind are read normally by the user in the map 30 turned upside down.

Thus, the user watching the map 30 can always read normally and correctly the character rows 36A to confirm that the road on which the user is moving to trace the route is the correct one. Namely, the map 30 generated by the PC 10 is held highly readable irrespective of the turning motion of the map 30 as held by the user.

Where the route includes two roads having respective different directions of movement thereon, the characters in the character row 36A of the first kind disposed in the area within the predetermined distance from the road symbol 32 representing one of the two roads, and the characters in the character row 36A of the first kind disposed in the area within the predetermined distance from the road symbol 32 representing the other road, are oriented differently in the map 30. Accordingly, the two character rows 36A of the first kind can be easily read and correctly perceived by the user tracing the route while watching the map 30, irrespective of the turning motion of the map 30 as held by the user.

The character row 36A of the first kind may be disposed in the area within the predetermined distance from the two or more road symbols 32 representing the respective roads of the route which have the respective different directions of movement thereon. According to the map generating routine executed by the PC 10 of the present embodiment, the character row 36A indicated above is oriented according to the direction of movement on one of the roads on which the user moves at first on the route according to the predetermined order of movements of the user on the roads of the route.

In the specific example of FIG. 3, for instance, the character row 36A of the first kind "SAKAE STATION" is disposed in areas within the predetermined distance from the two road symbols 32 representing the respective two roads which are selected as the route and which intersect each other at right angle. The direction of movement on one of the two roads is the south direction while the direction of movement on the other road is the east direction. In the route from the start point 38 to the designation point 40 in the map 30 of FIG. 3, the user of the map 30 moves on the road having the south direction before the user moves on the other road having the east direction as the direction of movement. Accordingly, the characters "SAKAE STATION" in the character row 36A of the first kind are oriented such that the upward direction of the characters coincides with the south direction in the map 30.

The user of the map 30 usually moves while using buildings and other facilities existing in front of the user, as landmarks. In this respect, it is better to orient the characters in the character row 36A of the first kind according to the direction of movement on one of the roads of the route which is nearest to the start point 38.

The characters in the character rows 36B of the second kind not disposed in the area within the predetermined distance from the road symbols 32 representing the roads of the route are not oriented according to the direction of movement on the route, but are oriented in the map 30 as originally fixed, for easier distinction of the character rows 36B of the second kind from the character rows 36A of the first kind, for easier recognition of the roads of the route and the facilities along the roads of the route. In this respect, the character rows 36A of the first kind are relied upon by the user of the map 30 in tracing the route, but the character rows 36B of the second kind are not relied upon by the user.

The expression "oriented in the map 30 as originally fixed" is interpreted to mean orienting the characters in the character rows 36B of the second kind, irrespective of the direction of movement on the roads, such that the upward direction of the characters coincides with the upward direction (north direction) in the map 30, in principle. However, some of the character rows 36B of the second kind identifying some roads and railroads may be "oriented fixedly" so as to extend along the road symbols 32 or railroad symbols 33.

Figure 4:
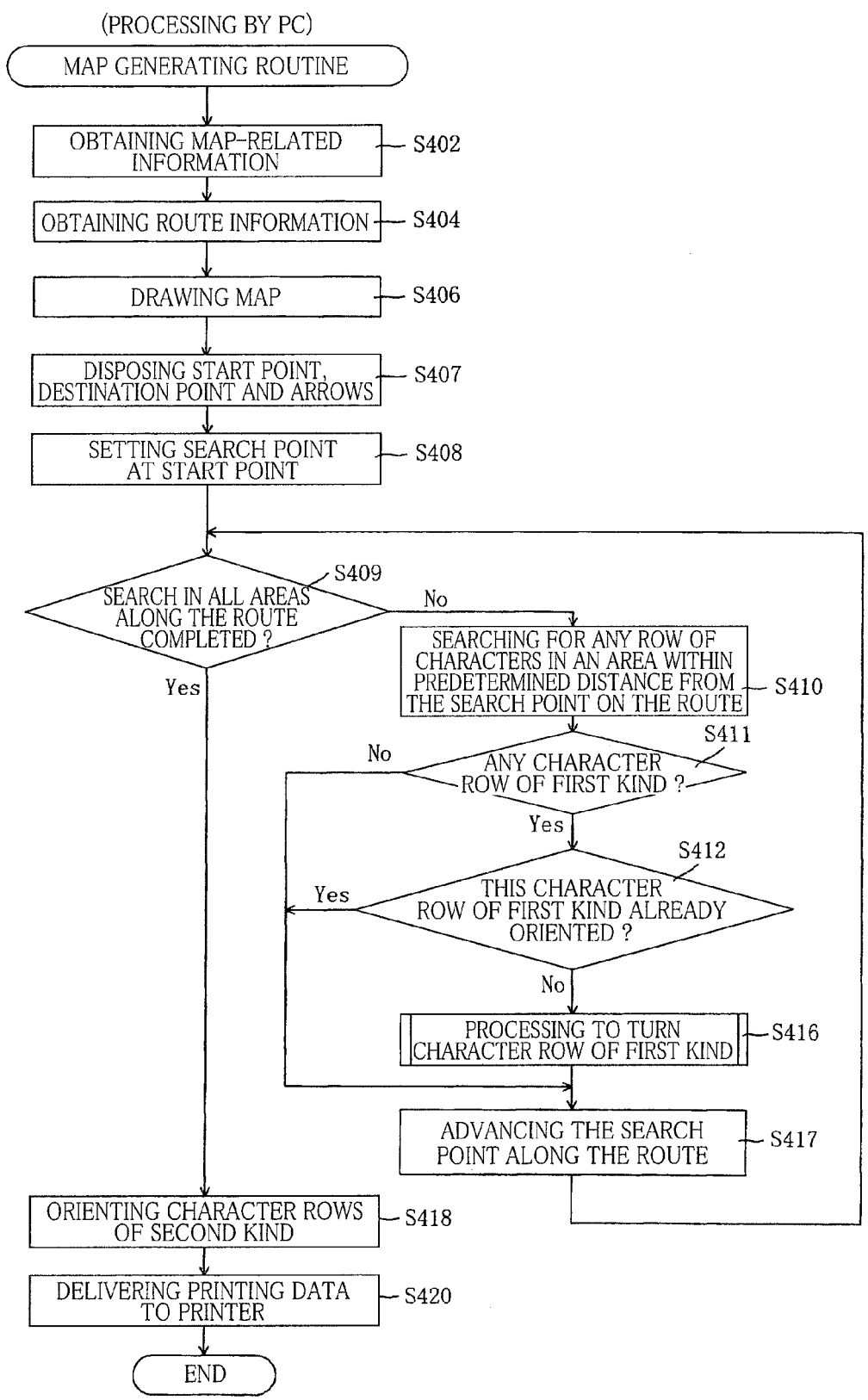
FIG. 4 is a flow chart illustrating the map generating routine executed by the personal computer.

Reference is now made to the flow chart of FIG. 4 illustrating the map generating routine executed by the CPU 11 of the PC 10. This map generating routine is executed to generate the map 30 including the rows of characters 36 disposed therein, according to the printer driver 14a, using the map information and point information included in the map-related information. The present routine is initiated when the user instructs the PC 10 to print the map 30 after the user has set the start point and destination point.

The map generating routine is initiated with step S402 in which the CPU 11 obtains the map-related information and stores the obtained map-related information in the map-related-information memory 13a. As previously described, the map-related information includes the map information, road information and point information.

Then, the CPU 11 goes to step S404 to determine the route on the basis of the start point and destination point, and obtains route information indicative of at least one of the road symbols 32 in the map 30, which represents at least one road selected as the route from the start point to the destination point. However, the route may be determined by utilizing a route determining function of a map searching website or map application. The route information to be obtained in step S404 includes information indicative of the order of the roads selected as the route, in which the user moves on the roads, and information indicative of the direction of passage or movement of the user from the start point to the destination point. Step S404 is followed by step S406 to draw the map 30 in the map-drawing memory 13b on the basis of the obtained route information, and step S407 to dispose the start point 38, destination point 40 and arrows 42.

Subsequently, the CPU 11 goes to step S408 to set a search point at the start point 38. The search point is a reference position which determines an area in which a search is implanted to detect any row of characters 36 as the character row 36A of the first kind disposed along the route from the start point 38 to the destination point 40. Step S409 is then implemented to determine whether the search is completed for all roads selected as the route, to detect all character rows 36A of the first kind. If a negative determination (NO) is obtained in step S409, the CPU 11 goes to step S410 to search for the rows of characters 36A in the area within the predetermined distance from the presently set search point, that is, the rows of characters 36A disposed in the area within the predetermined distance from any road symbol 32 representing any road selected as the route. Described more specifically, the reference position of each row of characters 36 is represented by the coordinates included in the point information, and the row of character 36 is selected or determined as the character row 36A of the first kind if the reference position of this row of characters 36 is located in an area within the predetermined distance from the search point. The use of the reference position represented by the coordinate values permits adequate selection or determination of the character rows 36A of the first kind which are relied upon by the user to trace the route to the destination point 40.

In the present embodiment, an actual distance on the ground surface is calculated on the basis of a distance obtained from the coordinate values of the reference position of each row of characters 36 and the coordinate values of the search point, and if the calculated actual distance is not longer than a predetermined value, for example, 30 m, the reference position of the row of characters 36 in question is determined to be located in the area within the predetermined distance. However, the size of the area, that is, the predetermined distance may be changed according to the width of the road symbol 32 representing each road selected as the route. In view of the rows of characters 36 disposed near the buildings or other facilities, the reference position of each row of characters 36 may be replaced by the location (represented by coordinate values) of the facility. In this case, the row of characters 36 representing the facility is determined to be disposed in the area within the predetermined distance from the road symbol 32, if the location of the facility lies within the predetermined distance from the road symbol 32.

The CPU 11 then goes to step S411 to determine whether there exists any character row 36A of the first kind in the area within the predetermined distance from the search point. If an affirmative determination (YES) is obtained in step S411, the CPU 11 goes to step S412 to determine whether the character row 36A of the first kind has already been properly oriented. If a negative determination (NO) is obtained in step S412, the CPU 11 goes to step S416 to perform a processing operation to turn the character row 36A of the first kind, that is, to orient the character row 36A of the first kind in a variable manner according to the direction of movement of the user on each road of the route. This step S416 will be described in detail by reference to the flow chart of FIG. 5. If it is determined in step S411 that there are two or more character rows 36A of the first kind, the negative determination (NO) is obtained in step S412 if any one of the two or more character rows 36A of the first kind has not already been properly oriented. In this case, step S416 is implemented for any character row 36A of the first kind which has not already been properly oriented.

Step S417 is implemented following step S416, or if a negative determination (NO) is obtained in step S411 or if an affirmative determination (YES) is obtained in step S412. In this step S417, the search point is advanced by a predetermined distance toward the destination point 40 along the route, that is, along at least one road symbol 32 representing the at least one road which is selected as the route (indicated by the arrow or arrows 42) along which the user of the map 30 moves from the start point 38 to the destination point 40. That is, the search point is advanced by the predetermined distance along the route from the start point 38 toward the destination point 40, to detect any character row 36A of the first kind disposed in the area within the predetermined distance from each of at least one road symbol 32 representing at least one road selected as the route. If a plurality of character rows 36A of the first kind are found, the order of the character rows 36A can be detected in the order of the roads from the start point 38 to the destination point 40.

The CPU 11 then goes back to step S409 and repeat steps S410-S417, to detect any character row 36A of the first kind in the area within the predetermined distance from the new search point. If the negative determination (NO) is obtained in step S411, the CPU 11 goes to step S417 to further advance the search point by the predetermined distance. Step S417 is implemented also if all character rows 36A of the first kind have been properly oriented. The direction of orientation of the character rows 36A of the first kind disposed in the areas within the predetermined distance from the respective roads is determined according to the direction of movement of the user on one of the roads on which the user moves at first on the route according to the predetermined order of movements on the roads. In the specific example of FIG. 3, all character rows 36A of the first kind within the predetermined distance from the search points along the first one of the two roads (two road symbols 32) of the route which is nearest to the start point 38 are initially found or detected and properly oriented according to the direction of movement of the user of the map 30 on the first road which extends perpendicularly to the second road.

As a result of repetition of steps S409-S417, the search point is eventually advanced to the destination point 40, and all character rows 36A of the first kind within the predetermined distance from the search points along the second road of the route up to the destination point 40 are properly oriented according to the direction of movement of the user on the second road, in the example of FIG. 3. That is, the search in all areas along the entire length of the route is completed, so that an affirmative determination (YES) is obtained in step S409, and the CPU 11 goes to step S418 to orient the rows of characters 36 other than the character rows 36A of the first kind, that is, to orient all character rows 36B of the second kind in the same predetermined manner, that is, in an originally fixed manner of orientation. Then, the CPU 11 goes to step S420 to generate printing data for controlling the printer 20 to print the map 30 drawn in the map drawing memory 13b, and deliver the generated printing data to the printer 20. The map generating routine of FIG. 43 is terminated with step S420. Thus, the map 30 described above by reference to FIG. 3 is printed by the printer 20.

Figure 5:
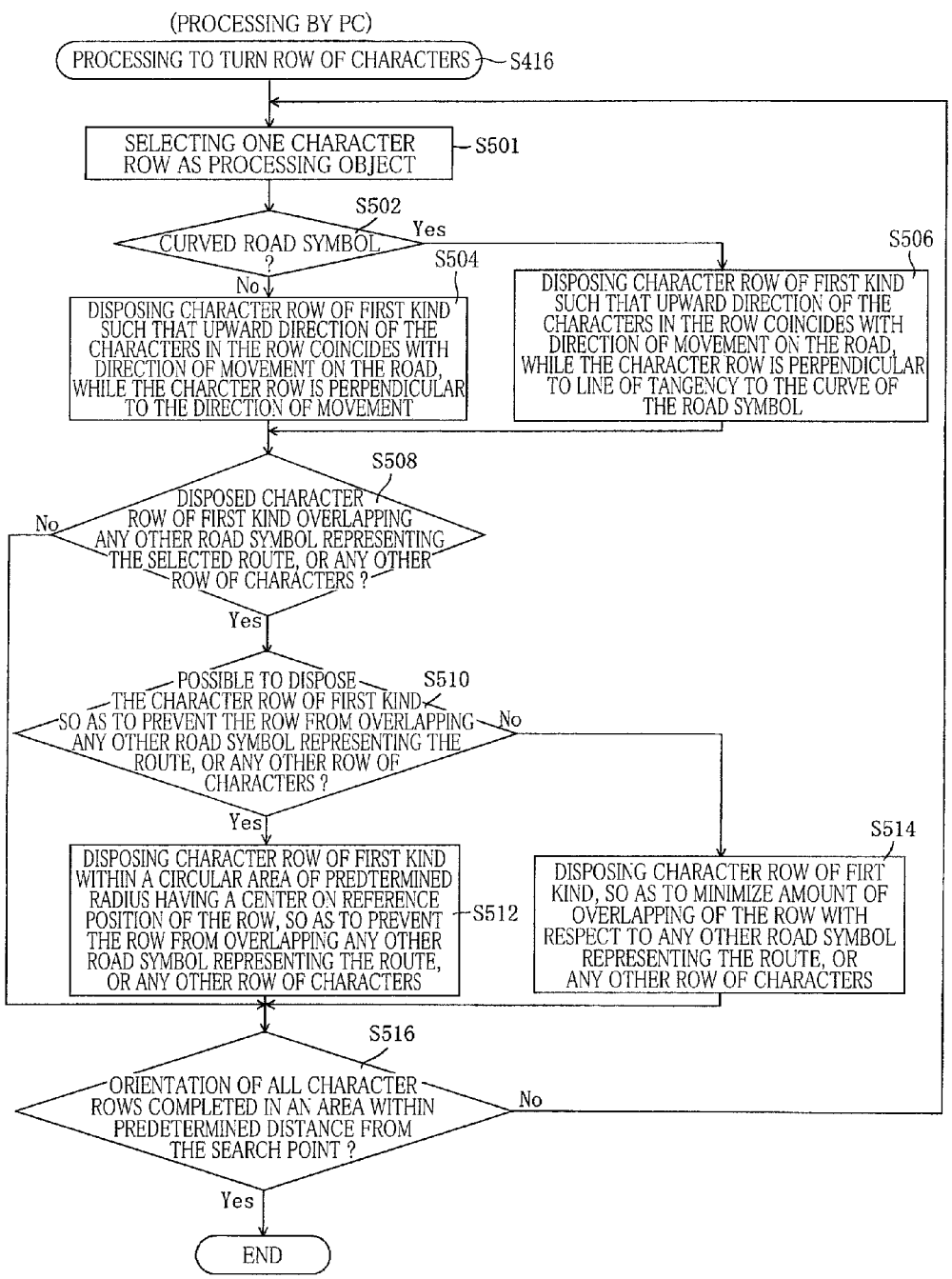
FIG. 5 is a flow chart illustrating a character turning step implemented in the map generating routine of FIG. 4 to turn a row of characters on the map.

Reference is made to the flow chart of FIG. 5 illustrating the character turning step S416 of the map generating routine of FIG. 4, which is executed by the CPU 11 to determine the direction of orientation of each character row 36A of the first kind detected in the areas within the predetermined distance from all search points, and to orient the character rows 36A of the first kind in the determined directions in the map 30. In the character turning step S416, the CPU 11 initially implements step S501 to select, as the character row 36A of the first kind to be oriented, a non-oriented one of the character rows 36A of the first kind which have been detected in the area within the predetermined distance from the present search point. Then, the CPU 11 goes to step S502 to determine whether the road symbol 32 along which the selected character row 36A is disposed and which is located within the predetermined distance from the search point is curved or not, on the basis of the road information. If a negative determination (NO) is obtained in step S502, the CPU 11 goes to step S504 to determine the orientation of the selected character row 36A such that the upward direction of the characters in the character row 36A coincides with the direction of movement of the user on the road in question while the character row 36A is perpendicular to the direction of movement (direction of extension of the road symbol 32), and to dispose the character row 36A in the map 30 by turning the character row 36A in the determined orientation. In the present embodiment, the characters standing in the vertical direction are arranged in the horizontal direction in the row 36A extending perpendicularly to the direction of movement (direction of extension of the road symbol 32 in question). Where the characters standing in the vertical direction are arranged in the vertical direction, the character row 36A may be disposed so as to extend in the vertical direction parallel to the direction of movement (direction of extension of the road symbol 32 in question).

If an affirmative determination (YES) is obtained in step S502, the CPU 11 goes to step S506 to determine the orientation of the selected character row 36A such that the upward direction of the characters in the character row 36A coincides with the direction of movement of the user on the road in question while the character row 36A is perpendicular to the line of tangency to the curve of the road symbol 32 at the search point, and to dispose the character row 36A in the map 30 by turning the character row 36A in the determined orientation. Thus, the character row 36A of the first kind which is disposed in the area within the predetermined distance from the cured road symbol 32 can be suitable oriented. Where the characters standing in the vertical direction are arranged in the vertical direction, the character row 36A may be disposed so as to extend parallel to the line of tangency to the curve of the road symbol 32.

Step S504 and S506 are followed by step S508 to determine whether the disposed character row 36A of the first kind overlaps any other road symbol 32 representing any other road of the selected route, or any other row of characters 36. The expression "any other road symbol 32" is interpreted to mean any road symbol 32 which represents any other road of the route and which is other than the road symbol 32 with respect to which the character row 36A in question (selected in step S501) is disposed within the predetermined distance. As a result of turning of the character row 36A of the first kind selected in step S501 is turned, the character row 36A of the first kind in question may overlap the road symbol 32 with respect to which the character row 36A in question is disposed within the predetermined distance. This overlapping of the character row 36A and road symbol 32 does not cause confusion of the relationship between those character row 36A and road symbol 32, since that character row 36A is provided to identify the road represented by that road symbol 32. However, if the character row 36A selected in step S501 and turned in step S504 or S506 overlaps any other road symbol 32 representing any other road of the route, this overlapping causes confusion of the relationship between the selected character row 36A and the two road symbols 32.

Therefore, if a negative determination (NO) is obtained in step S508, there arises no problem, and the CPU 11 goes to step S516 to determine whether all character rows 36A of the first kind detected in the area within the predetermined distance from the present search point have been properly oriented. If a negative determination (NO) is obtained in step S516, the CPU 11 goes back to step S501 to select the next character row 36A of the first kind as the processing object to be oriented, and repeats steps S501-S516 until an affirmative determination (YES) is obtained in step S516.

If an affirmative determination (YES) is obtained in step S508, the CPU 11 goes to step S510 to determine whether it is possible to dispose the character row 36A of the first kind in question within a circular area of a predetermined radius having its center at the reference position (represented by the coordinate values) of the character row 36A, so as to prevent the character row 36A from overlapping any other road symbol 32 representing any other road of the route, or any other row of characters 36.

If an affirmative determination (YES) is obtained in step S510, the CPU 11 goes to step S512 to dispose the selected character row 36A of the first kind within the circular area of the predetermined radius, so as to prevent the character row 36A from overlapping any other road symbol 32, or any other row of characters 36. Step S512 is followed by Step S516. Thus, the selected character row 36A of the first kind is oriented or disposed so as to prevent any other road symbol 32 from disturbing the user in perceiving the road symbol 32 in question representing the road selected as the route. Unless the selected character row 36A overlaps any other road symbol 32 or any other row of characters 36, the affirmative determination (YES) is obtained in step S510, even if the selected character row 36A overlaps the corresponding road symbol 32 with respect to which the selected character row 36A is disposed within the predetermined distance, that is, overlaps the road symbol 32. In this case, too, the selected character row 36A is disposed so as to overlap the corresponding road symbol 32. As described above, even if the selected character row 36A overlaps the road symbol 32 with respect to which the selected character row 36A is disposed within the predetermined distance, this overlapping does not cause confusion of the relationship between those character row 36A and road symbol 32, since that character row 36A is provided to identify the road represented by that road symbol 32.

If a negative determination (NO) is obtained in step S510, the CPU 11 goes to step S514 to dispose the selected character row 36A of the first kind within the circular area of the predetermined radius, so as to minimize the amount of overlapping of the character row 36A with respect to any other road symbol 32 or any other row of characters 36, such that the reference position of the character row 36A is located at the center of the circular area. Step S514 is followed by step S516. The affirmative determination (YES) is eventually obtained in step S516 when all character rows 36A of the first kind detected within the predetermined distance from the present search point have been properly oriented as a result of repeated execution of the routine of FIG. 5.

The map generating routine of FIG. 4 corresponding to a map generating portion, more specifically, the step S416 of FIG. 5 (routine of FIG. 5) executed by the CPU 11 may be modified to perform a step to determine whether the selected character row 36A overlaps the road symbol 32 in question with respect to which the selected character row 36A is disposed within the predetermined distance, that is, overlaps the road symbol 32 on which the search point is located, and a step which is implemented if an affirmative determination is obtained in the above-indicated step, to move the reference position of the selected character row 36A in the direction away from the road symbol 32 in question on which the search point is located, for minimizing the amount of overlapping of the selected character row 36A with respect to the road symbol 32 in question after the selected character row 36A is turned in the map 30. This modification makes it possible to reduce the amount of overlapping of the turned character row 36A of the first kind with respect to the road symbol 32 representing the road selected as the route, and accordingly enables the user of the map 30 to easily recognize the route from the start point 38 to the destination point 40.

The above-described processing to turn the character rows 36A of the first kind in step S416 of the map generating routine of FIG. 4, which has been described by reference to the flow chart of FIG. 5, permits adequate orientation of the character rows 36A according to the direction of movement of the user on the selected route, and positioning of each character row 36A in the circular area having the predetermined radius, so that the route is easily recognized by the properly located character rows 36A.

It will be understood that the PC 10 serves as a computer, and a map generating device, while the printer driver 14a provides a map generating program.

It will also be understood that a portion of the CPU 11 assigned to implement the above-described step S402 serves as a map-information obtaining portion, a character-information obtaining portion, and a coordinate-information obtaining portion, and that a portion of the CPU 11 assigned to implement the above-described step S404 serves as a route-information obtaining portion, a movement-direction obtaining portion, and an order obtaining portion. It will further be understood that a portion of the CPU 11 assigned to implement the above-described step S410 serves as a character-row selecting portion, while a portion of the CPU 11 assigned to implement the above-described step S416 serves as an indication-manner determining portion, and that a portion of the CPU 11 assigned to execute the map generating routine of FIG. 4 serves as a map generating portion, while a portion of the CPU 11 assigned to implement the above-described step S502 serves as a curve determining portion.

While the preferred embodiment of the present invention has been described above by reference to the drawings, for illustrative purpose only, it is to be understood that the present invention is not limited to the details of the illustrated embodiment, but may be embodied with various changes and modifications, which may occur to those skilled in the art, without departing from the spirit and scope of the invention defined in the appended claims.

In the illustrated embodiment, the PC 10 serves as the computer or map generating device according to the present invention, while the printer driver 14a provides the map generating program according to the present invention. However, the printer 20 or any other device such as a cellular or portable phone may be the map generating device according to the present invention, and the program installed in such a device may be the map generating program according to the present invention.

In the map generating routine according to the illustrated embodiment, the character rows 36A of the first kind are selected depending upon whether the reference positions of the rows of characters 36 are disposed in the areas within the predetermined distance from the road symbols 32. However the map generating routine may be modified to select the character rows 36A of the first kind depending upon whether the reference positions of the markings (e.g., symbols 34) indicative of the positions of the roads, railroads, buildings and other facilities identified by the respective rows of characters 36 are disposed within the predetermined distance from the road symbol 32 representing each road of the selected route. Described in detail, the step S402 to obtain the map-related information is modified to obtain marking information indicative of the positions of the markings disposed in the map, or image information of the markings. The thus modified step S402 corresponds to an example of a marking-information obtaining portion. Further, the step S410 is modified to search for the markings in an area within the predetermined distance from the search point on the route, and to select, as the character rows 36A of the first kind, the rows of characters 36 corresponding to those markings. If there is any character row 36A of the first kind, that is, if the affirmative determination (YES) is obtained in the step S411 while the negative determination (NO) is obtained in the step S412, the character row 36A of the first kind is properly turned or oriented in the step S416. According to the modification described above, the rows of characters 36 corresponding to the markings indicative of the positions of the facilities appearing in the map are properly turned or oriented, where the markings are located near the road symbols 32, even if the rows of characters 36 disposed in the map are spaced apart from the road symbols 32 representing the roads of the route. That is, those rows of characters 36 which identify the facilities located near the roads of the route are selected as the character rows 36A of the first kind, which are turned according to the direction of movement of the user of the map on the roads of the route, so that the turned character rows 36A identifying the facilities represented by the markings are easily read by the user moving on the route.

Alternatively, the map generating routine may be modified to select the character rows 36A of the first kind depending upon whether the buildings and other facilities identified by the rows of characters 36 are located alongside of any road selected as the route. Described in detail, the step S402 to obtain the map-related information is modified to obtain marking information indicating each of the markings that is disposed in the map and located alongside of any road of the route and identifying that road, or image information of the markings. The thus modified step S402 corresponds to an example of a marking-information obtaining portion. Further, the step S410 is modified to search for the markings in the area within the predetermined distance from the search point on the route, to determine whether each of the facilities represented by those markings is located alongside of any road of the route, and to select as the character rows 36A of the first kind, the rows of characters 36 corresponding to the markings representing the facilities located alongside of any road of the route. If there is any character row 36A of the first kind, that is, if the affirmative determination (YES) is obtained in the step S411 while the negative determination (NO) is obtained in the step S412, the character row 36A of the first kind is properly turned or oriented in the step S416. According to the modification described above, the rows of characters 36 corresponding to the facilities appearing in the map are properly turned or oriented, where the facilities are located alongside of any road of the route, even if the rows of characters 36 disposed in the map are spaced apart from the road symbols 32 representing the roads of the route. That is, those rows of characters 36 which identify the facilities located alongside of any road of the route are selected as the character rows 36A of the first kind, which are turned according to the direction of movement of the user of the map on the roads of the route, so that the turned character rows 36A identifying the facilities represented by the markings are easily read by the user moving on the route. In this respect, it is noted that the user traces the route to the destination point 40, while relying on the facilities located alongside of the roads of the route, so that the present modification improves the convenience of the map.

In the illustrated embodiment, the map 30 generated by the PC 10 is printed by the printer 20. However, the map generated by the PC 10 may be displayed on a liquid crystal display of a cellular or portable phone. In this case, too, the advantages described above with respect to the illustrated embodiment may be enjoyed.

In the illustrated embodiment, the printed characters of the character rows 36A of the first kind are turned or rotated according to the direction of movement of the user on the route. However, each character row 36A of the first kind may be displayed or printed in an emphasized or accentuated manner, or in a selected particular color or size, according to the direction of movement of the user on the route. In this case, too, the character rows 36A of the first kind can be easily perceived. For instance, the character rows 36A of the first kind are displayed or printed in different colors depending upon the respective different directions of movement of the user on the respective different roads of the route, so that the user can easily trace the roads of the route. Thus, the manner of indication or representation of the character rows 36A of the first kind in the map is changed according to the direction of movement of the user on each road of the route.

In the illustrated embodiment, the rows of characters 36 are disposed in the map 30 drawn on the basis of the map information. However, the principle of the present invention is equally applicable to the map information wherein images of the map 30 and images of the rows of characters 36 are integrated with each other. In this case, only the rows of characters 36 are extracted from the map information, and inserted or disposed in the map 30 according to the direction of movement of the user on the route.

What is claimed is:

1. A memory medium storing a map generating program executed by a computer, the program comprising the steps of:
    obtaining map information for generating a map which includes a start point and a destination point;
    obtaining route information indicative of at least one road selected as a route from the start point to the destination point, from among roads indicated in the map;
    obtaining, on the basis of the obtained route information, a direction of movement on each of the at least one road selected as the route, from the start point toward the destination point;
    obtaining character information corresponding to rows of characters disposed in the map;
    the step of selecting at least one character row as a character row of a first kind from among the rows of characters corresponding to the obtained character information, on the basis of positional relationships between the rows of characters and each of the at least one road selected as the route, each of the at least one character row of the first kind being indicated in the map in a variable indication manner, while each of at least one character row of a second kind which is other than the at least one character row of the first kind being indicated in the map in a non-variable indication manner;
    determining, when a plurality of roads having at least two different directions of movement are selected as the route on the basis of the obtained route information, the indication manner of each of the character rows of the first kind selected on the basis of the positional relationships of the character rows with the respective roads, according to the at least two different directions of movement on the respective roads, such that the indication manner of the character rows of the first kind having one of the at least two different directions is different from the indication manner of the character rows of the first kind having another of the at least two different directions; and
    generating the map on the basis of the obtained map information and the obtained character information, such that the character rows of the first kind are indicated in the map in the determined manners.

2. The memory medium according to claim 1, wherein the step of selecting at least one character row is a step of selecting at least one row of characters disposed in an area within a predetermined distance from each of the at least one road selected as the route, as the character row of the first kind, and each of the other rows of characters not disposed in the area, as the character row of the second kind, and wherein the step of determining the indication manner is a step of determining the indication manner of each of the character rows of the first kind selected in the step of selecting at least one character row, according to the directions of movement on the respective roads, such that the manner of indication of each character row of the first kind disposed in the area within the predetermined distance from one of the plurality of roads is different from the manner of indication of each character row of the first kind disposed in the area within the predetermined distance from another of the plurality of roads.

3. The memory medium according to claim 1, the program further comprising the step of:

obtaining marking information indicative of markings which correspond to the respective rows of characters and which are disposed in the map, and wherein the step of selecting at least one row of characters is a step of selecting, as the character row of the first kind, at least one row of characters respectively corresponding to at least one of the markings which is disposed in an area within a predetermined distance from each of the at least one road selected as the route, and as the character row of the second kind, at least one row of characters respectively corresponding to at least one of the markings which is not disposed in the area, the step of determining the indication manner is a step of determining the indication manner of each of the character rows of the first kind selected in the step of selecting at least one row of characters, according to the directions of movement of the respective roads, such that the manner of indication of each character row of the first kind corresponding to the marking disposed in the area within the predetermined distance from one of the plurality of roads is different from the manner of indication of each character row of the first kind corresponding to the marking disposed in the area within the predetermined distance from another of the plurality of roads.

4. The memory medium according to claim 1, the program further comprising the step of:

obtaining marking information indicative of markings which correspond to the respective rows of characters and which are disposed in the map, wherein the step of selecting at least one row of characters is a step of selecting, as the character row of the first kind, at least one row of characters respectively corresponding to at least one of the markings which is located alongside of each of the at least one road selected as the route, and as the character row of the second kind, at least one row of characters respectively corresponding to at least one of the markings which is not located alongside of any of the at least one road, and wherein the step of determining the indication manner is a step of determining the indication manner of each of the character rows of the first kind selected in the step of selecting at least one character row, according to the directions of movement of the respective roads, such that the indication manner of each character row of the first kind corresponding to the marking located alongside of one of the plurality of roads is different from the indication manner of each character row of the first kind corresponding to the marking located alongside of another of the plurality of roads.

5. The memory medium according to claim 2, wherein the step of determining the indication manner is a step of determining a direction of orientation of each character row of the first kind in the map according to the direction of movement on the corresponding road of the route with respect to which said each character row of the first kind is disposed in the area within the predetermined distance.

6. The memory medium according to claim 2, wherein the step of determining the indication manner is a step of determining a direction of orientation of each character row of the first kind in the map such that an upward direction of the characters of the character row coincides with the direction of movement on the corresponding road of the route with respect to which said each character row of the first kind is disposed in the area within the predetermined distance.

7. The memory medium according to claim 2, wherein the step of selecting at least one row of characters is a step of changing the predetermined distance according to a width of each of the at least one road selected as the route, and selecting, as the character row of the first kind, each row of characters disposed in the area within the changed distance from the corresponding road.

8. The memory medium according to claim 2, the program further comprising the step of:

determining whether the road with respect to which each character row of the first kind is disposed in the area within the predetermined distance is curved or not, and wherein the step of determining the indication manner is a step of determining is a step of determining, if it is determined that the road with respect to which the character row of the first kind is disposed in the area is curved, a direction of orientation of the character row of the first kind according to a direction of extension of a line of tangency to a curve of the road.

9. The memory medium according to claim 5, the program further comprising the step of:

obtaining an order of movement of a user of the map from the start point to the destination point on the plurality of roads having the respective different directions of movement, which are selected as the route on the basis of the obtained route information, and wherein the step of determining the indication manner is a step of determining a direction of orientation of the character rows of the first kind disposed in the areas within the predetermined distance from respective ones of the plurality of roads, according to the direction of movement of the user on one of the plurality of roads on which the user moves at first on the route according to the obtained order of movement.

10. The memory medium according to claim 2, the program further comprising the step of:

obtaining coordinate information indicative of reference positions of the rows of characters corresponding to the character information obtained in the step of obtaining character information, and wherein the step of selecting at least one row of characters is a step of selecting, as the character row of the first kind, at least one row of characters disposed in an area within a predetermined distance from each of the at least one road selected as the route, on the basis of the coordinate information obtained in the step of obtaining coordinate information.

11. The memory medium according to claim 1, wherein the step of generating the map is a step of generating the map in which the at least one character row of the second kind selected from among the rows of characters corresponding to the character information obtained in the step of obtaining character-information is indicated in the non-variable indication manner.

12. The memory medium according to claim 2, wherein the step of generating the map is a step of generating the map such that each character row of the first kind is disposed while taking account of overlapping of the character row of the first kind with respect to any of the at least one road of the route which is other than the road with respect to which the character row of the first kind is disposed in the area within the predetermined distance.

13. The memory medium according to claim 2, wherein the step of generating the map is a step of generating the map such that each character row of the first kind is disposed while taking account of overlapping of the character row of the first kind with respect to the road of the route with respect to which the character row of the first kind is disposed in the area within the predetermined distance.

14. A map generating device comprising:
- a map-information obtaining portion configured to obtain map information for generating a map which includes a start point and a destination point;
- a route-information obtaining portion configured to obtain route information indicative of at least one road selected as a route from the start point to the destination point, from among roads indicated in the map;
- a movement-direction obtaining portion configured to obtain, on the basis of the obtained route information, a direction of movement on each of the at least one road selected as the route, from the start point toward the destination point;
- character-information obtaining portion configured to obtain character information corresponding to rows of characters disposed in the map;
- character-row selecting portion configured to select at least one character row as a character row of a first kind from among the rows of characters corresponding to the obtained character information, on the basis of positional relationships between the rows of characters and each of the at least one road selected as the route, each of the at least one character row of the first kind being indicated in the map in a variable indication manner, while each of at least one character row of a second kind which is other than the at least one character row of the first kind being indicated in the map in a non-variable indication manner;
- an indication-manner determining portion configured to be operable when a plurality of roads having at least two different directions of movement are selected as the route on the basis of the obtained route information, to determine the indication manner of each of the character rows of the first kind selected on the basis of the positional relationships of the character rows with the respective roads, according to the at least two different directions of movement on the plurality of roads, such that the indication manner of each character row of the first kind having one of the at least two different directions is different from the indication manner of each character row of the first kind having another of the at least two different directions; and
- a map generating portion configured to generate the map on the basis of the map information obtained by the map-information obtaining portion and the character information obtained by the character-information obtaining portion, such that the character rows of the first kind are indicated in the map in the manners determined by the indication-manner determining portion.

15. The map generating device according to claim 14, wherein the character-row selecting portion selects at least one row of characters disposed in an area within a predetermined distance from each of the at least one road selected as the route, as the character row of the first kind, and each of the other rows of characters not disposed in the area, as the character row of the second kind,
and wherein the indication-manner determining portion determines the indication manner of each of the character rows of the first kind selected by the character-row selecting portion, according to the directions of movement on the respective roads, such that the manner of indication of each character row of the first kind disposed in the area within the predetermined distance from one of the plurality of roads is different from the manner of indication of each character row of the first kind disposed in the area within the predetermined distance from another of the plurality of roads.

16. The map generating device according to claim 15, wherein the indication-manner determining portion determines a direction of orientation of each character row of the first kind in the map according to the direction of movement on the corresponding road of the route with respect to which said each character row of the first kind is disposed in the area within the predetermined distance.

17. The map generating device according to claim 15, wherein the indication-manner determining portion determines a direction of orientation of each character row of the first kind in the map such that an upward direction of the characters of the character row coincides with the direction of movement on the corresponding road of the route with respect to which said each character row of the first kind is disposed in the area within the predetermined distance.

18. The map generating device according to claim 15, further comprising a curve determining portion configured to determine whether the road with respect to which each character row of the first kind is disposed in the area within the predetermined distance is curved or not,
and wherein the indication-manner determining portion determines, if the curve determining portion determines that the road with respect to which the character row of the first kind is disposed in the area is curved, a direction of orientation of the character row of the first kind according to a direction of extension of a line of tangency to a curve of the road.

19. The map generating device according to claim 16, further comprising an order obtaining portion configured to obtain an order of movement of a user of the map from the start point to the destination point on the plurality of roads having the respective different directions of movement, which are selected as the route on the basis of the obtained route information,
and wherein the indication-manner determining portion determines a direction of orientation of the character rows of the first kind disposed in the areas within the predetermined distance from respective ones of the plurality of roads, according to the direction of movement of the user on one of the plurality of roads on which the user moves at first on the route according to the obtained order of movement.

20. The map generating device according to claim 14, further comprising a coordinate-information obtaining portion configured to obtain coordinate information indicative of reference positions of the rows of characters corresponding to the character information obtained by the character-information obtaining portion,
and wherein the character-row selecting portion selects, as the character row of the first kind, at least one row of characters disposed in an area within a predetermined distance from each of the at least one road selected as the route, on the basis of the coordinate information obtained by the coordinate-information obtaining portion.

\* \* \* \* \*